Dec. 11, 1951  J. H. WAGGONER  2,577,936
COLORED GLASS FIBER PRODUCT AND METHOD FOR MAKING SAME
Filed May 7, 1949
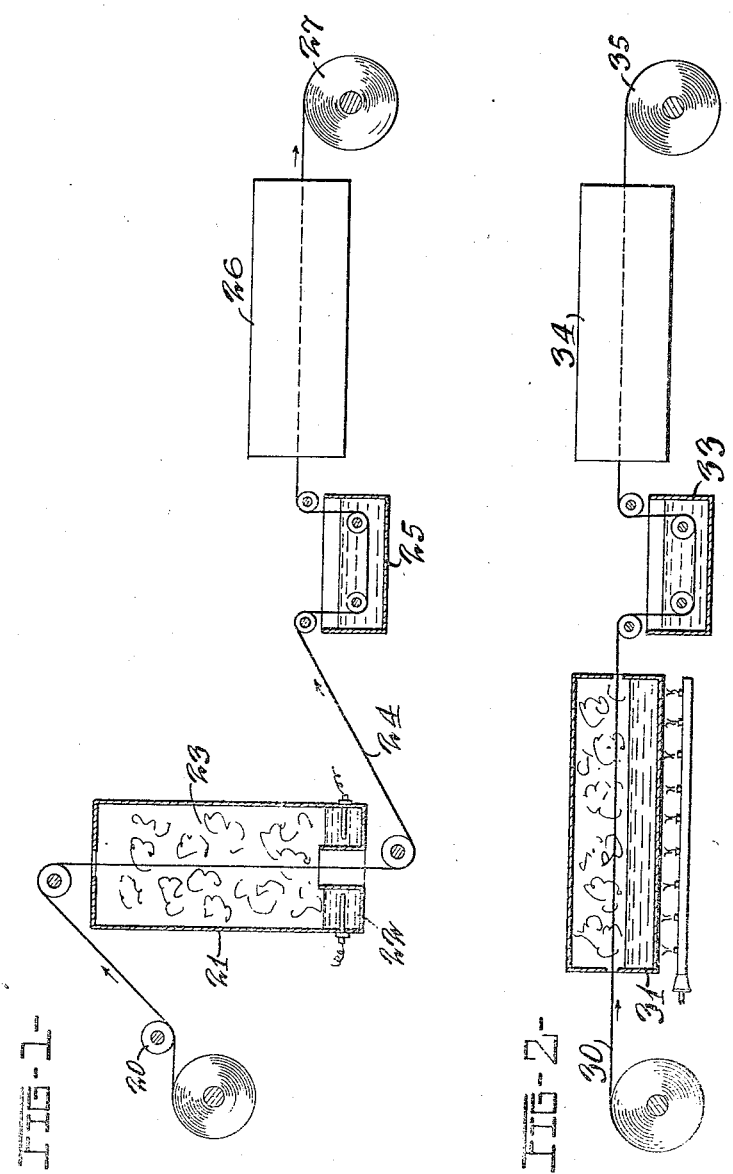

Patented Dec. 11, 1951

2,577,936

UNITED STATES PATENT OFFICE 2,577,936

COLORED GLASS FIBER PRODUCT AND
METHOD FOR MAKING SAME

Jack H. Waggoner, Newark, Ohio, assignor to
Owens-Corning Fiberglas Corporation, a corporation of Delaware Application May 7, 1949, Serial No. 92,009

9 Claims. (Cl. 117—54)

1

This invention relates to glass fiber products and more particularly to colored glass fibers and to methods for producing the same.

Full utilization of glass fibers in textile fabrics and related structures has not been realized and may not be realized until suitable means are provided for permanently coloring glass fibers independently of the melt from which the fibers are formed. Many of the difficulties in coloring glass fibers stem from the perfectly smooth and inert surfaces of the fiber which provide little anchorage for coloring matter or for a base in which suitable tinctional agents might be incorporated.

There are some resinous materials which are adherent to glass fiber surfaces under normal conditions, which materials might function as a colorable base, but even with these the bond is markedly weakened in the presence of high humidity or upon direct contact with water. This loss in bond strength apparently results from the intervening moisture layer which preferentially forms on the hydrophilic glass fiber surfaces under such conditions. Thus both physical and chemical forces, inherent in the natural glass fiber, are unfavorable to the use of the usual techniques for coloring or printing.

It is an object of this invention to produce colored glass fibers and to provide a method for manufacturing the same.

Another object is to produce glass fibers that are permanently colored without interfering with other desirable characteristics of the fiber and it is a related object to produce colored glass fibers having in combination one or more improved properties, such as better hand and feel, draping qualities characteristic of the finest silks and woolens, increased abrasion resistance, resistance to slippage of the weave, and sheen or luster controlled to a desired degree.

A further object is to produce colored glass fibers by reaction on the glass fiber surfaces to introduce coloring matter associated therewith in a manner to militate against loss by fading or removal incident to the normal handling of the fiber or fabric.

A still further object is to provide a practical, economical and effective method for coloring glass fibers to give predetermined shades and effects.

These and other objects and advantages of this invention will hereinafter appear, and for the purpose of illustration but not of limitation, various techniques for carrying out the invention are shown schematically in the accompanying drawing, in which:

2

Figure 1 is a schematic layout of apparatus for carrying out the invention; and

Figure 2 is a similar view showing a modified system.

It has been discovered that glass fibers in individual or fabric form may be permanently colored by the thermal treatment of the fibers with the deposit of a vapor of a metallic component having desirable coloring oxides.

It is difficult theoretically to set forth the exact course of the reaction which occurs on the glass fiber surfaces to give the desired effect under the reaction conditions. However it appears as if the vapors or the deposit from vapors of the metallic salt either reacts on the glass fiber surfaces to provide thereon what is believed to be a colored oxide or it might be that the reaction is that of the deposit or salt with groupings that predominate on the glass fiber surfaces to develop the desired color. Whatever the reason, it is evident that the color characteristics developed may be varied in accordance with the metallic component of which the salt is formed, the molecular arrangement to which the salt might be converted by heat treatment, the molecular composition of the original salt and the atmosphere in which it is reacted. By what apparently is a thermal reaction of the deposits from the metallic salt vapor on the glass fiber surfaces, the coloring particles generate with a semblance of colloidal form which exists in such excellent distribution as to appear as a continuous film on the fibers.

The inorganic nature of the fibers encourages such uniform distribution and it favors such intimate association of the coloring reaction product as will resist removal from the glass fiber surfaces by moisture or other physical means. In the same sense, the inorganic nature of the coloring reaction product minimizes the possibility of deterioration or attack by light, heat, chemicals or light rays to which the fabric might ordinarily be subjected. Thus the color produced on the fibers is of a permanent character and is in such form and distribution as will not effect the desirable properties of glass fibers and fabrics produced therefrom. In fact, the presence of reaction product uniformly distributed over the glass fiber surfaces imparts a greater degree of resistance to abrasion and by controlling the amount of such particles the fibers may be delustered to a desired degree.

Treatment to deposit coloring matter may be carried out with glass fibers of the staple type or of the continuous type, with strands and yarns formed of staple or continuous glass fibers and with fabrics formed therefrom. It may be carried out with glass fibers in combination with other fibers capable of withstanding the rigorous conditions of heat treatment, for example asbestos. It may be achieved in conjunction with the fiber forming process, or preferably by the treatment of fibers subsequent to their formation, such as after the fibers have been processed in yarns or cloth. It may be carried out with fibers that have been sized during their manufacture with conventional materials, such as gelatin, starch or resinous compositions or with fibers from which the size may be removed by a solvent or water wash or by heat treatment.

As the vaporizable metallic salt, polyvalent metals in the form of chlorides, bromides or iodides may be used. In some instances the more volatile metal carbonyls may be used and also the corresponding metallic salts of organic radicals having less than four carbon atoms, such as the tetraethyl tin derivatives, the acetylacetones and the like.

Suitable polyvalent metals of which the salt may be constituted are represented by antimony, arsenic, barium, beryllium, bismuth, copper, lead, mercury, tin, titanium and zinc. The latter three, under most conditions, give a substantially colorless reaction product which is highly receptive to coloring with dyes and pigments in a manner conventional to the textile trade.

To achieve the desired results, the glass fibers, heated or unheated, are advanced over or in the near vicinity of a bath of inorganic salts heated sufficiently to vaporize the molten material. In the alternative, the glass fiber fabric may be advanced through a relatively closed chamber saturated with the vapors of the metallic salt. In this instance the vapors may be evolved from a bath within the chamber or else the vapors may be directed into the chamber from an external source. Reaction may occur responsive to heat transmitted from the molten bath or introduced in other ways into the chamber. Sufficient heat from the apparent molecular rearrangement that fixes the deposited material on the glass fiber surfaces and develops the color may also be supplied by a subsequent heat treatment after the vapors have condensed or deposits collected on the fibers.

The temperature for effecting the desired thermal reaction is about 1200° to 1300° F. but higher temperatures may be used, limited only by the temperature at which the fibers are fused together. The minimum temperature which it is advantageous to employ is usually about 600° F. but on occasion may go as low as 450° F. with corresponding increase in time of exposure. Between these temperatures various time and temperature combinations may be used; illustrated by reaction for 3 to 5 minutes at 600° F. or 2 to 5 seconds at 1200° F. Under the more severe of these reaction conditions, say from one to two minutes at 900° F. to 2 to 5 seconds at 1200° F., a certain amount of weave setting is effected wherein the fibers while in yarn or fabric form relax and are permanently set in their twisted and woven relation. This gives the textile the hand or flexibility desired for most decorative uses. It also is responsible, to an appreciable extent, for the life, wrinkle and crease resistance as well as the properties which enable the fabric to be draped in soft and rippling folds. Properties such as these are new to glass fibers.

As illustrated in Figure 1, a glass fiber fabric 20, with or without size, is advanced in about 5 minutes through a heated tower 21 having a material, such as iron chloride 22, in the base thereof under sufficiently high temperature, say about 675° to 775° C. to evolve vapors 23 which more or less saturate the tower to form deposits on the glass fibers as they pass therethrough. Reaction of the desired character is secured responsive to the heat existing in the tower to bring about a molecular rearrangement to form what appears to be a colloidal ecru coloring product uniformly distributed on the glass fiber surfaces.

After passage through the tower, the fibers of the colored fabric 24 are preferably lubricated by passage through a dip tank 25 containing a dilute coating solution, such as 1 or 2 per cent by weight of an organo silicon fluid of the type dimethyl polysiloxane, diphenyl polysiloxane, diethyl polysiloxane and the like, inorganic solvent or in aqueous emulsion. The diluent is removed upon exposure to 250° to 300° F. for five to ten minutes in an oven 26 and the treated cloth is then wound on a roll 27 for distribution. Best results are secured when the organo silicon is baked for a few seconds at a temperature between 600° to 800° F. to harden the resin to the crispness of a starched fabric if desired, and at the same time further set the weave or relax the fibers to give greater flexibility and better drape. Instead of an organo silicon fluid other oleaginous, starch, gelatin or soap lubricants, or resinous coating or film forming materials may be used.

Instead of advancing the glass fiber fabric through a vapor tower, as illustrated in Figure 1, the fabric 30 may be merely passed over a molten bath 31 of the inorganic metallic salt, as illustrated in Figure 2, to expose the fibers directly to the emitted vapors. The heat to which the glass fiber fabric is subjected while passing the melt, say within an inch or two over the surface of the melt, is sufficient to effect the desired thermal reaction to form the coloring reaction product on the glass fiber surfaces. The colored fibers may then be led into a dip tank 33 containing a suitable lubricant, size or coating material and the solvents are removed by a drying oven 34 to provide a colored textile 35 fit for commercial use.

It will be apparent from the description that there has been produced a new and practical method for providing a durable color to glass fibers without the necessity of incorporating the coloring elements into the glass fiber batch.

It will be understood that numerous changes may be made in the details of construction, arrangement and operation without departing from the spirit of this invention, especially as defined in the following claims.

I claim:

1. The method of coloring glass fibers which consists in contacting the glass fiber surfaces with the vapors of a decomposable salt of a polyvalent metal, the oxides of which are colored, while heating the glass fibers under normal atmospheric conditions to a temperature of at least 600° F. but below the fusion temperature of the glass composition of which the fibers are formed for 3-5 minutes at the lower temperature to no more than a few seconds at the higher temperature.

2. In the method of coloring glass fibers, the steps which consists in contacting the glass fiber surfaces with the vapors of a decomposable inorganic salt of a polyvalent metal selected from the group consisting of antimony, arsenic, barium, beryllium, bismuth, copper, lead, mercury, tin, titanium and zinc, while heating the fibers under normal atmospheric conditions to a temperature of at least 600° F. but below the fusion temperature for the glass composition of which the fibers are formed for a time ranging from 3-5 minutes at the lower temperature to no more than a few seconds at the higher temperature.

3. The method of coloring glass fibers comprising the steps of contacting the glass fiber surfaces with vapors of a decomposable salt of a polyvalent metal in which the salt forming component is selected from the group consisting of chlorides, bromides, and iodides and in which the metallic component is selected from the group consisting of antimony, arsenic, barium, beryllium, bismuth, copper, lead, mercury, tin, titanium and zinc, while heating the fibers under normal atmospheric conditions to a temperature of at least 600° F. but below the fusion temperature of the glass composition of which the fibers are formed for a time ranging from 3-5 minutes at the lower temperature to no more than a few seconds at the higher temperature.

4. The method of coloring glass fibers which consists in contacting the glass fiber surfaces with the vapors of a decomposable inorganic salt of a polyvalent metal while heating the glass fibers under normal atmospheric conditions to a temperature of at least 900° F. but below the fusion temperature of the glass composition of which the fibers are formed for a time ranging from 2 minutes at the lower temperature to no more than a few seconds at the higher temperature, treating the colored glass fibers with a polysiloxane, and baking the polysiloxane treated fibers for a short time at a temperature of about 600-800° F. to set the polysiloxane on the glass fiber surfaces.

5. The method of coloring glass fibers which consists in condensing onto the glass fiber surfaces the vapors of a decomposable inorganic salt of a polyvalent metal, the oxides of which are colored, while heating the glass fibers upon which the vapors are condensed under normal atmospheric conditions to a temperature of at least 600° F. but below the fusion temperature of the glass composition of which the fibers are formed for a time ranging from 3-5 minutes at the lower temperature to no more than a few seconds at the higher temperature, treating the colored glass fibers with a polysiloxane, and baking the polysiloxane treated fibers for a short time at a temperature of about 600-800° F. to set the polysiloxane compound on the glass fiber surfaces.

6. Glass fibers colored by the method set forth in claim 1.

7. Glass fibers colored and weave set by the method set forth in claim 4.

8. Glass fiber fabric the fibers of which are colored by the method set forth in claim 5.

9. The method of coloring glass fibers comprising the steps of contacting the glass fiber surfaces with vapors of a decomposable salt of a polyvalent metal in which the salt forming component comprises a low aliphatic organic radical and in which the metallic component is selected from the group consisting of antimony, arsenic, barium, beryllium, bismuth, copper, lead, mercury, tin, titanium and zinc, while heating the fibers under normal atmospheric conditions to a temperature of at least 600° F. but below the fusion temperature of the glass composition of which the fibers are formed for a time ranging from 3-5 minutes at the lower temperature to no more than a few seconds at the higher temperature.

JACK H. WAGGONER.

REFERENCES CITED

The following references are of record in the file of this patent:

UNITED STATES PATENTS

| Number | Name | Date |
|---|---|---|
| 2,392,805 | Biefeld | Jan. 15, 1946 |
| 2,428,600 | Williams | Oct. 7, 1947 |